(12) United States Patent
Hu

(10) Patent No.: US 6,731,815 B1
(45) Date of Patent: May 4, 2004

(54) HUMAN VISION BASED PRE-PROCESSING FOR MPEG VIDEO COMPRESSION

(75) Inventor: Shane Ching-Feng Hu, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 0 days.

(21) Appl. No.: 09/518,428

(22) Filed: Mar. 3, 2000

(51) Int. Cl.⁷ .................................................. G06K 9/36
(52) U.S. Cl. ..................... 382/240; 382/260; 348/225.1
(58) Field of Search ................................. 382/240, 100, 382/260; 348/225.1; 330/149; 369/44.13

(56) References Cited

U.S. PATENT DOCUMENTS

| | | | | |
|---|---|---|---|---|
| 4,471,318 A | * | 9/1984 | Akagiri ........................ | 330/149 |
| 4,736,241 A | * | 4/1988 | Murakami et al. ........ | 348/225.1 |
| 5,043,965 A | * | 8/1991 | Iida et al. ................. | 369/44.13 |
| 6,285,798 B1 | * | 9/2001 | Lee ............................. | 382/260 |
| 6,381,341 B1 | * | 4/2002 | Rhoads ........................ | 382/100 |

OTHER PUBLICATIONS

"Asynchrony in Image Analysis: Using the Luminance–To–Response–Latency Relationship To Improve Segmentation" Pierre–Yves Burgi and Thierry Pun, Journal of the Optical Society of America A, Optics, Image Science, and Vision, vol. 11, No. 6/ Jun. 1994.

"The Laplacian Pyramid as a Compact Image Code", Peter J. Burt and Edward H. Adelson, IEEE Transactions on Communications, vol., Com–31, No. 4 Apr. 1983.

"Brightness Perception in Complex Fields", C.J. Bartleson and E.J. Breneman, Journal of The Optical Society of America, vol. 57, No. 7, Jul. 1967.

A Perceptually Tuned Subband Image Coder Based on the Measure of Just–Noticeable–Distortion Profile, Chun–Hsien Chou and Yun–Chin Li, IEEE Transaction on Circuits and Systems for Video Technology, vol. 5, No. 6, Dec. 1995.

"Adaptive Quantization of Picture Signals Using Spatial Masking", Arun N. Netravali and Birendra Prasada, Proceedings of the IEEE, vol. 65, No. 4 Apr. 1977.

"Intensity–Dependent Spatial Summation", Tom N. Cornsweet and John I. Yellott, Jr., 1985 Optical Society of America, vol. 2, No. 10 Oct. 1985.

Human Luminance Patern–Vision Mechanisms: Masking Experiments Require a New Model, John M. Foley, 1994 Optical Society of America, vol. 11, No. 6 Jun. 1994.

* cited by examiner

*Primary Examiner*—Anh Hong Do
(74) *Attorney, Agent, or Firm*—Francis I. Gray

(57) ABSTRACT

Human vision based pre-processing for MPEG video compression uses light intensity. An input video signal is input to a contrast gain control circuit where a Gaussian pyramid is constructed. The reduced pyramid image serves as a local light level. The reduced pyramid image also is processed to obtain a global light center. The difference between the local light level and the global light center is used as an index to a lookup table that provides a local gain control signal. The local gain control signal and a global gain control signal input to the contrast gain control circuit are used to multiply a Laplacian image derived from the input image, the resulting modified Laplacian image being subtracted from an equivalent lowpass filtered video image to produce a preprocessed output video signal having reduced bandwidth for input to an MPEG2 compressor.

18 Claims, 2 Drawing Sheets

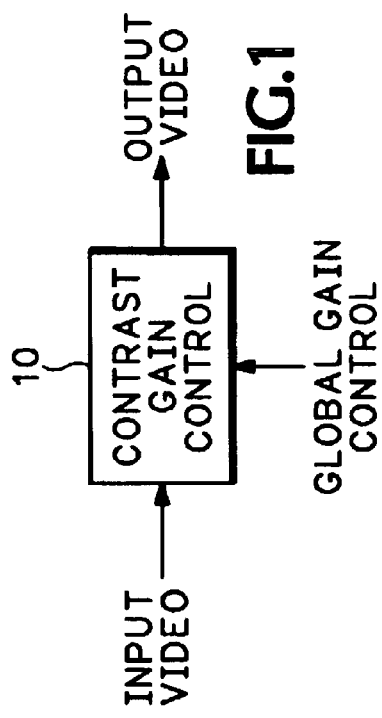
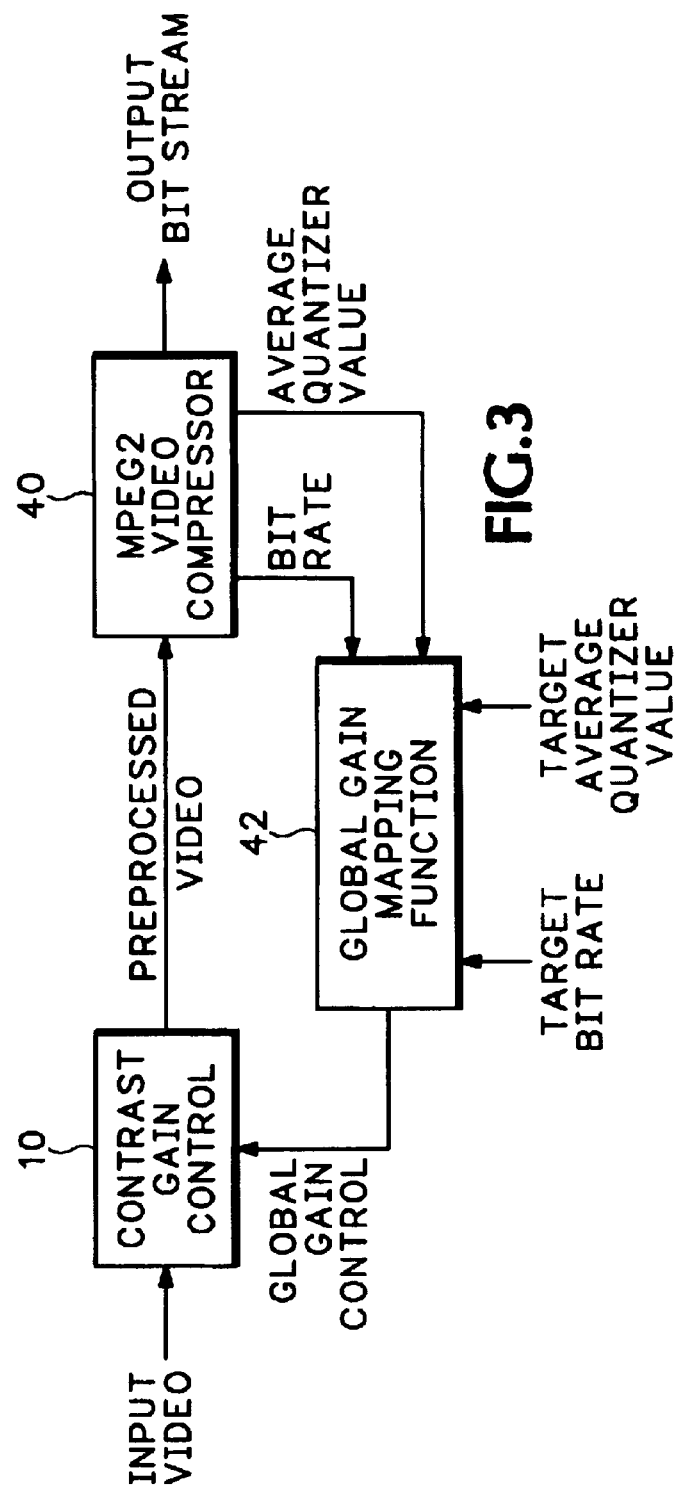

HUMAN VISION BASED PRE-PROCESSING FOR MPEG VIDEO COMPRESSION

BACKGROUND OF THE INVENTION

The present invention relates to video compression, and more particularly to human vision based pre-processing for MPEG video compression that reduces the input bandwidth to a video compressor in a way that is visually optimal.

Video signals are usually characterized in three dimensions, i.e., two-dimensional spatial and temporal domains. The signal may be separated into luminance and chrominance component signals. The luminance component signal requires more bandwidth for faithful representation by video compression systems. Much research has been done to take the Human Vision System into account when designing video (image) compression algorithms. In "Adaptive Quantization of Picture Signals Using Spatial Masking", Arun N. Netravali and Birendra Prasada, Proceedings of the IEEE, Vol. 65, No. 4, April 1977, pp. 536–548, and "MPEG2 Test Model 5, Adaptive Quantization", ISO-IED/JTC1/SC29/WG11, April 1993, spatial masking by using luminance activity is used for bandwidth reduction. In "A Perceptually Tuned Subband Image Coder Based on the Measure of Just-Noticeable-Distortion Profile", Chun-Hsien Chou and Yun-Chin Li, IEEE Transactions on Circuits and Systems for Video Technology, Vol. 5, No. 6, December 1995, pp. 467–476, a more sophisticated subband image coder is described.

The Human Vision System is very adaptive to cope with the wide dynamic range of light intensity variations. Extensive research work has been done in this area, although most used simple stimuli. For complex signals "Intensity-Dependent Spatial Summation", Tom N. Cornsweet and John I. Yellott, Jr., J. Opt. Soc. Am., Vol. 2, No. 10, October 1985, pp. 1769–1786, "Asynchrony in Image Analysis: Using the Luminance-to-Response-Latency Relationship to Improve Segmentation", Pierre-Yves Burgi and Tierry Pun, J. Opt. Soc. Am., Vol. 11, No. 6 June 1994, pp. 1720–1726, "Human Luminance Pattern-Vision Mechanisms: Masking Experiments Require a New Model", John M. Foley, J. Opt. Soc. Am., Vol 11, No. 6, June 1994, pp. 1710–1719, and the Chou et al article mentioned above show some very interesting insight to the process of light adaptation and contrast gain control. The adaptation process may be viewed as contrast gain control of the human eye's light sensing mechanism. The gain depends on the local as well as global (surround) light level. For complex signals there is a light center that represents the range of light intensity which is optimal for the particular complex signal. Local variation of the light level means that the sensor efficiency is degraded. A phenomenon, such as simultaneous contrast, may be explained in this way. The visibility of the same spatial pattern may be very different when viewed under different surrounds, see "Brightness Perception in Complex Fields", C. J. Bartleson and E. J. Breneman, J. Opt. Aoc. Am., Vol. 57, July 1967, pp. 953–957.

What is desired is human vision based pre-processing for MPEG video compression that uses light intensity which offers the possibility of reducing visual redundancy while keeping the distortion in the spatial domains as well as the temporal domain to a minimum.

BRIEF SUMMARY OF THE INVENTION

Accordingly the present invention provides human vision based pre-processing for MPEG video compression that uses light intensity. An input video signal is input to a contrast gain control circuit where a Gaussian pyramid is constructed. The reduced pyramid image serves as a local light level. The reduced pyramid image also is processed to obtain a global light center. The difference between the local light level and the global light center is used as an index to a lookup table that provides a local gain control signal. The local gain control signal and a global gain control signal input to the contrast gain control circuit are used to multiply a Laplacian image derived from the input image, the resulting modified Laplacian image being subtracted from an equivalent lowpass filtered video image to produce a preprocessed output video signal having reduced bandwidth for input to an MPEG2 compressor.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a conceptual block diagram view of a video pre-processor according to the present invention.

FIG. 3 is a system block diagram view of a feedback compression system using the pre-processor according to the present invention.

DETAILED DESCRIPTION OF THE INVENTION

Figure 2:
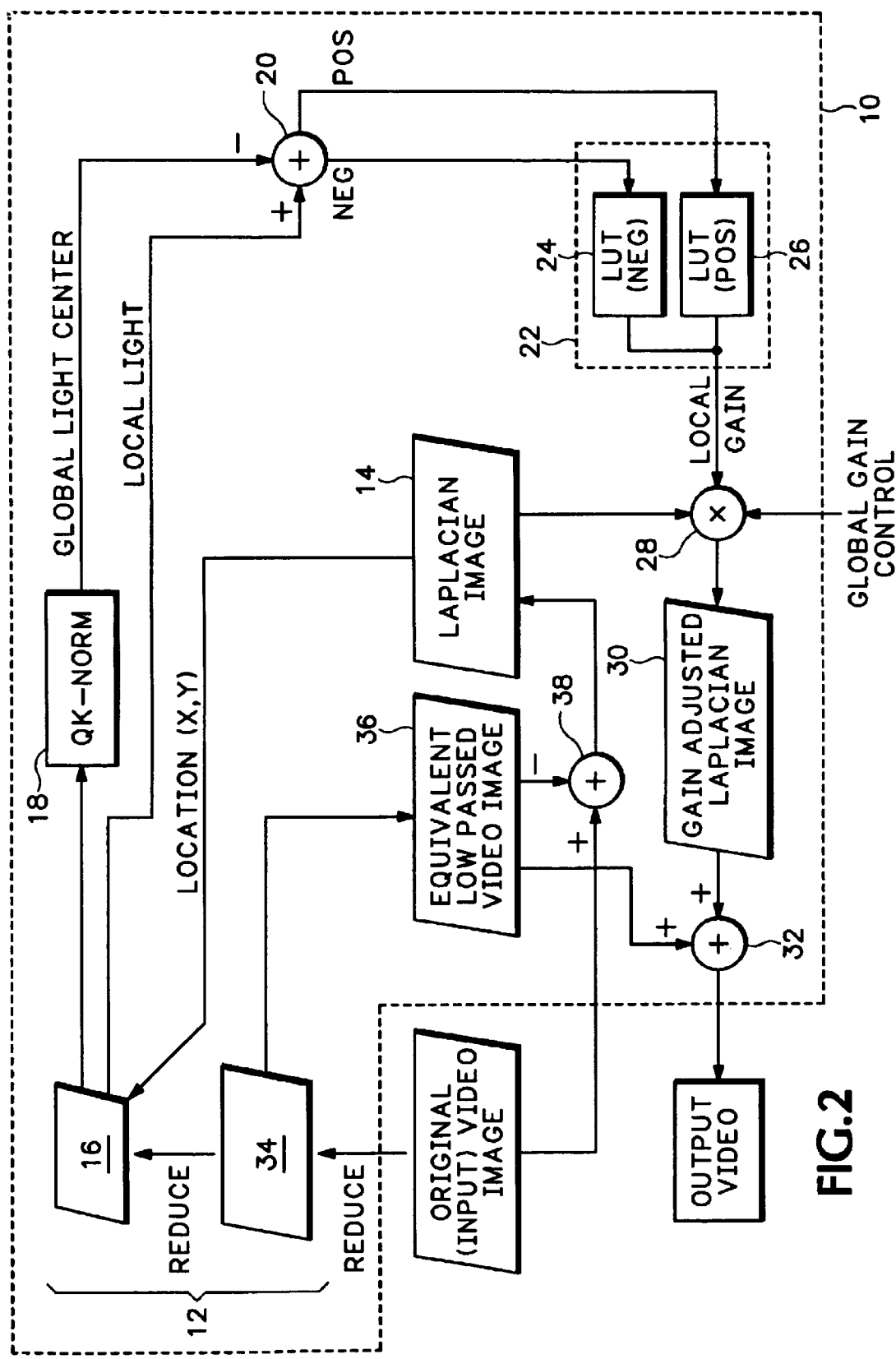
FIG. 2 is a more detailed block diagram view of the video pre-processor illustrating the pre-processing according to the present invention.

Referring now to FIG. 1 an overview of a contrast gain control function 10 is shown, having an input video signal and a pre-processed output video signal, the pre-processing being governed by a global gain control signal and the light level of the input video signal. A more detailed functional block diagram is shown in FIG. 2.

A Gaussian pyramid 12 is constructed from the input video image, and a Laplacian image 14 is calculated, as in "The Laplacian Pyramid as a Compact Image Code", Peter J. Burt and Edward H. Anderson, IEEE Trans. Comm. Vol. COM-31, No. 4, April 1983, PP. 532–540. The Laplacian image may be viewed as the "spatial pattern", while the corresponding luminance in the reduced pyramid image 16 serves as a local light level.

The reduced pyramid image 16 also is used to calculate a global light center. The global light center lies between the peak and average luminance of the reduced pyramid image 16. A Q-norm of $k^{th}$ power 18, where k is a constant with a typical value of 4, is used to estimate the global light center:

$qk$-power=$1/N$(SUM$ij$($Pij$ raised to the power of $k$))

$qk$-norm=($qk$-power raised to the power of $1/k$)

where Pij is the luminance of each pixel and N is the total number of pixels.

A subtractor 20 is used to obtain the difference between the local light level and the global light center, which difference is used as an index to a sensitivity lookup table 22 to determine the "local gain" factor. The sensitivity lookup table may be in the form of two tables 24, 26 that correspond respectively to the negative and positive differences between the local light level and the global light center. If the bandwidth of the transmission system limits the amount of detail (texture) that the compression system may represent, an additional "global gain" factor may be introduced to reduce the global texture energy for further bandwidth reduction purposes. The Laplacian image 14 is multiplied pixel by pixel by both the "global gain" and "local gain" factors in a multiplier 28 to produce a gain adjusted Laplacian image 30.

The output video image is formed by adding in an adder 32 the Laplacian image to an expanded pyramid image 34 that has been filtered to produce an equivalent lowpass filtered video image 36. The Laplacian image 14 is formed from the equivalent lowpass filtered video image 36 being subtracted in a summer 38 from the original input video image.

As shown in FIG. 3 the contrast gain control pre-processor 10 is coupled with an MPEG2 video compressor 40 to form a closed loop feedback system for bandwidth reduction. The bit rate and average quantizer value from the compressor 40 are input to a global mapping function 42 to which also are input a target bit rate and target average quantizer value. The mapping function 42 generates the global gain control signal for input to the contrast gain control pre-processor 10. The mapping function 42 may be implemented as a lookup table where the mapping values provide more filtering where the texture is more visible, i.e., the mapping function acts as a perceptual "equalizer".

Thus the present invention provides human vision based pre-processing for MPEG2 video compression to reduce the bandwidth input to the compressor in a way that is visually optimal using a Laplacian pyramid of the input video signal to generate a local gain factor, multiplying a Laplacian image by the local gain and a global gain factor to produce a gain adjusted Laplacian image, and adding the gain adjusted Laplacian image to an equivalent lowpass filtered video image to produce the output video signal.

What is claimed is:

1. A method of pre-processing an input video signal to generate a pre-processed video signal with reduced bandwidth for input to a video compressor comprising the steps of:
   constructing a Gaussian pyramid from the input video signal;
   obtaining a local light level and a global light center from the Gaussian pyramid;
   from the local light level and global light center generating a local gain control signal;
   multiplying a Laplacian image derived from the input video signal by the local gain control signal to produce a modified Laplacian image; and
   subtracting the modified Laplacian image from an equivalent video image derived from the input video signal to produce the pre-processed video signal.

2. The method as recited in claim 1 wherein the multiplying step further includes also multiplying the Laplacian image by a global gain control signal to produce the modified Laplacian image.

3. The method as recited in claim 1 further comprising the step of subtracting the equivalent video image from the input video signal to produce the Laplacian image.

4. The method as recited in claim 1 wherein the obtaining step comprises:
   selecting a reduced pyramid image from the Gaussian pyramid as the local light level; and
   performing a Q-norm of k*th* power on the reduced pyramid image to produce the global light center.

5. The method as recited in claim 1 wherein the generating step comprises the steps of:
   subtracting the global light center from the local light level to produce an index; and
   accessing a lookup table using the index to produce the local gain signal.

6. A method of human vision based pre-processing of an input video signal for reducing bandwidth for MPEG video compression comprising the steps of:
   deriving from the input video signal as a function of light intensity a local gain control signal; and
   modifying the input video signal as a function of the local gain control signal and a global gain control signal to produce a pre-processed, reduced bandwidth video signal for MPEG video compression.

7. The method as recited in claim 6 wherein the deriving step comprises the steps of:
   generating a local light level and a global light center from the input video signal; and
   combining the local light level and global light center to produce the local gain control signal.

8. The method as recited in claim 7 wherein the generating step comprises the steps of:
   obtaining the local light level from a reduced version of the input video signal; and
   normalizing the reduced version to obtain the global light center.

9. The method as recited in claim 8 wherein the combining step comprises the steps of:
   subtracting the global light center from the local light level to produce a contrast signal; and
   converting the contrast signal into the local gain control signal.

10. The method as recited in claim 9 wherein the converting step comprises the step of accessing a lookup table as a function of the contrast signal to obtain the local gain control signal.

11. The method as recited in claim 10 wherein the lookup table comprises a positive lookup table for positive values of the contrast signal and a negative lookup table for negative values of the contrast signal.

12. An apparatus for human based pre-processing of an input video signal to reduce bandwidth for video compression comprising:
    means for deriving a local gain control signal as a function of light intensity from the input video signal; and
    means for modifying the input video signal as a function of the local gain control signal and a global gain control signal to produce a pre-processed, reduced bandwidth video signal for MPEG compression.

13. The apparatus as recited in claim 12 wherein the deriving means comprises:
    means for generating a local light level and a global light center from the input video signal; and
    means for combining the local light level and the global light center to produce the local gain control signal.

14. The apparatus as recited in claim 13 wherein the generating means comprises:
    means for obtaining the local light level from a reduced version of the input video signal; and
    means for normalizing the reduced version to obtain the global light center.

15. The apparatus as recited in claim 14 wherein the combining means comprises:
    means for subtracting the global light center from the local light level to produce a contrast signal; and
    means for converting the contrast signal into the local gain control signal.

16. The apparatus as recited in claim 15 wherein the converting means comprises a lookup table accessed as a function of the contrast signal to obtain the local gain control signal.

17. The apparatus as recited in claim 16 wherein the lookup table comprises:
 a positive lookup table for positive values of the contrast signal; and
 a negative lookup table for negative values of the contrast signal.

18. The apparatus as recited in claim 12 further comprising:
 means for constructing a Gaussian pyramid from the input video signal, the highest level of the Gaussian pyramid being used to derive the local light level and global light center;
 means for generating a Laplacian signal and an equivalent video signal from the input video signal, the Laplacian signal being multiplied by the local and global gain control signals to produce a modified Laplacian signal; and
 means for subtracting the modified Laplacian signal from the equivalent video signal to produce the pre-processed, reduced bandwidth video signal for MPEG compression.

\* \* \* \* \*